(12) United States Patent
Han et al.

(10) Patent No.: US 9,265,068 B2
(45) Date of Patent: Feb. 16, 2016

(54) SEQUENCE GENERATION FOR CELL SPECIFIC REFERENCE SIGNAL (CRS)

(71) Applicants: Seunghee Han, Kyoungkido (KR); Alexei Davydov, Nizhny Novgorod (RU); Jong-Kae Fwu, Sunnyvale, CA (US); Yuan Zhu, Beijing (CN)

(72) Inventors: Seunghee Han, Kyoungkido (KR); Alexei Davydov, Nizhny Novgorod (RU); Jong-Kae Fwu, Sunnyvale, CA (US); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/122,642

(22) PCT Filed: Aug. 16, 2013

(86) PCT No.: PCT/US2013/055414
§ 371 (c)(1),
(2) Date: Nov. 26, 2013

(87) PCT Pub. No.: WO2014/088654
PCT Pub. Date: Jun. 12, 2014

(65) Prior Publication Data
US 2015/0189677 A1  Jul. 2, 2015

Related U.S. Application Data

(60) Provisional application No. 61/734,323, filed on Dec. 6, 2012, provisional application No. 61/768,330, filed on Feb. 22, 2013.

(51) Int. Cl.
*H04W 74/08* (2009.01)
*H04W 76/02* (2009.01)
(Continued)

(52) U.S. Cl.
CPC ....... *H04W 74/0833* (2013.01); *H04J 11/0069* (2013.01); *H04J 13/0003* (2013.01); *H04L5/005* (2013.01); *H04L 27/2613* (2013.01); *H04W 76/021* (2013.01); *H04B 7/0413* (2013.01); *H04J 2013/0096* (2013.01)

(58) Field of Classification Search
CPC .......... H04W 74/0833; H04W 76/021; H04L 5/005; H04L 27/2613; H04J 13/0003; H04J 11/0069; H04J 2013/0096; H04B 7/0413
See application file for complete search history.

(56) References Cited

U.S. PATENT DOCUMENTS

2009/0046570 A1 * 2/2009 Sarkar et al. ................... 370/203
2009/0135803 A1 * 5/2009 Luo et al. ....................... 370/350
(Continued)

FOREIGN PATENT DOCUMENTS

KR  10-2011-0118700 A  10/2011

OTHER PUBLICATIONS

International Search Report and Written Opinion mailed Nov. 25, 2013 from International Application No. PCT/US2013/055414, 12 pages.

(Continued)

*Primary Examiner* — Brian D Nguyen
(74) *Attorney, Agent, or Firm* — Schwabe, Williamson & Wyatt, P.C.

(57) ABSTRACT

In embodiments, an eNodeB (eNB) may include a sequence generator to identify an initialization parameter for a pseudo-random sequence. The initialization parameter may have a periodicity greater than one radio frame of a radio signal. The sequence generator may then generated a pseudo-random sequence based at least in part on the initialization parameter, and then generate a reference signal based on the pseudo-random sequence. The eNB may further include a transmitter that is coupled with the sequence generator and is to transmit the reference signal in a subframe of the radio signal.

19 Claims, 6 Drawing Sheets

(51) Int. Cl.
  *H04L 27/26* (2006.01)
  *H04L 5/00* (2006.01)
  *H04J 11/00* (2006.01)
  *H04J 13/00* (2011.01)
  *H04B 7/04* (2006.01)

(56) References Cited

U.S. PATENT DOCUMENTS

2010/0290557 A1    11/2010  Lee et al.
2011/0085503 A1*   4/2011   Nam et al. .................... 370/329
2011/0317641 A1*   12/2011  Noh et al. .................... 370/329
2012/0093122 A1*   4/2012   Dai et al. ..................... 370/330
2012/0176885 A1*   7/2012   Lee et al. ..................... 370/209
2012/0182974 A1*   7/2012   Dai et al. ..................... 370/336
2012/0188877 A1*   7/2012   Chin et al. .................... 370/241

OTHER PUBLICATIONS

International Preliminary Report on Patentability mailed Jun. 18, 2015 from International Application No. PCT/US2013/055414.

* cited by examiner

SEQUENCE GENERATION FOR CELL SPECIFIC REFERENCE SIGNAL (CRS)

CROSS REFERENCE TO RELATED APPLICATIONS

The present application is a national phase entry under 35 U.S.C. §371 of International Application No. PCT/US2013/055414, filed Aug. 16, 2013, entitled "SEQUENCE GENERATION FOR CELL SPECIFIC REFERENCE SIGNAL (CRS)", which designates the United States of America, and which claims priority to U.S. Provisional Patent Application No. 61/734,323, filed Dec. 6, 2012, entitled "Advanced Wireless Communication Systems and Techniques," and U.S. Provisional Patent Application No. 61/768,330, filed Feb. 22, 2013, entitled "Advanced Wireless Communication Systems and Techniques," the entire disclosures of which are hereby incorporated by reference in their entirety.

FIELD

Embodiments of the present invention relate generally to the technical field of generating a cell specific reference signal (CRS) for a third generation partnership (3GPP) long term evolution (LTE) network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In existing 3GPP LTE networks, the CRS may be transmitted from an eNodeB (eNB) to a user equipment (UE). In embodiments, the CRS may be used to support channel quality indicator (CQI) reporting and demodulation. Additionally, the CRS may be used to support reference signal received power (RSRP) and reference signal received quality (RSRQ) measurements for handover or for Radio Resource Management (RRM) purposes. The CRS may be transmitted as a quadrature phase shift keying (QPSK) modulated signal.

In embodiments, the CRS may be broadcast in each subframe of a radio frame and may have a periodicity of 10 milliseconds (ms). That is, the CRS may repeat every 10 milliseconds. In common LTE networks, a radio frame of the LTE network may generally have a length of 10 ms. Because the CRS may have a periodicity of 10 ms, the CRS may repeat at each radio frame, and the same patterns of the CRS may be broadcast at each subframe of the radio frame. In these embodiments, if a CRS of one eNB conflicts with or causes interference to a CRS of another eNB, or a CRS of another port of the eNB, on the same frequency Resource Elements (REs) in a subframe of the radio frame, then this interference may be repeated at every radio frame of the network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for reducing repeated interference of CRS transmissions between eNBs, or ports of an eNB, in an LTE network. In embodiments, the CRS may be based on a pseudo-random code. The pseudo-random code may be based at least in part on an initialization parameter with a periodicity greater than 10 ms. Specifically, the initialization of the pseudo-random code may be based on the system frame number (SFN) of the radio frame that the CRS will be transmitted in. By introducing the initialization parameter of the SFN to generation of the pseudo-random code that the CRS is based on, the periodicity of the CRS may be extended beyond 10 ms. This extension of periodicity may mean that if two CRSs conflict in one radio frame, then the conflict will not be repeated in each radio frame of a transmission. In some embodiments, the pseudo-random code may be based on a series of parameters defined by values of a length-31 Gold sequence, and the pseudo-random code initialization sequence may be modified so that more bits of the length-31 Gold sequence are available to accommodate the SFN parameter used for the pseudo-random code initialization.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
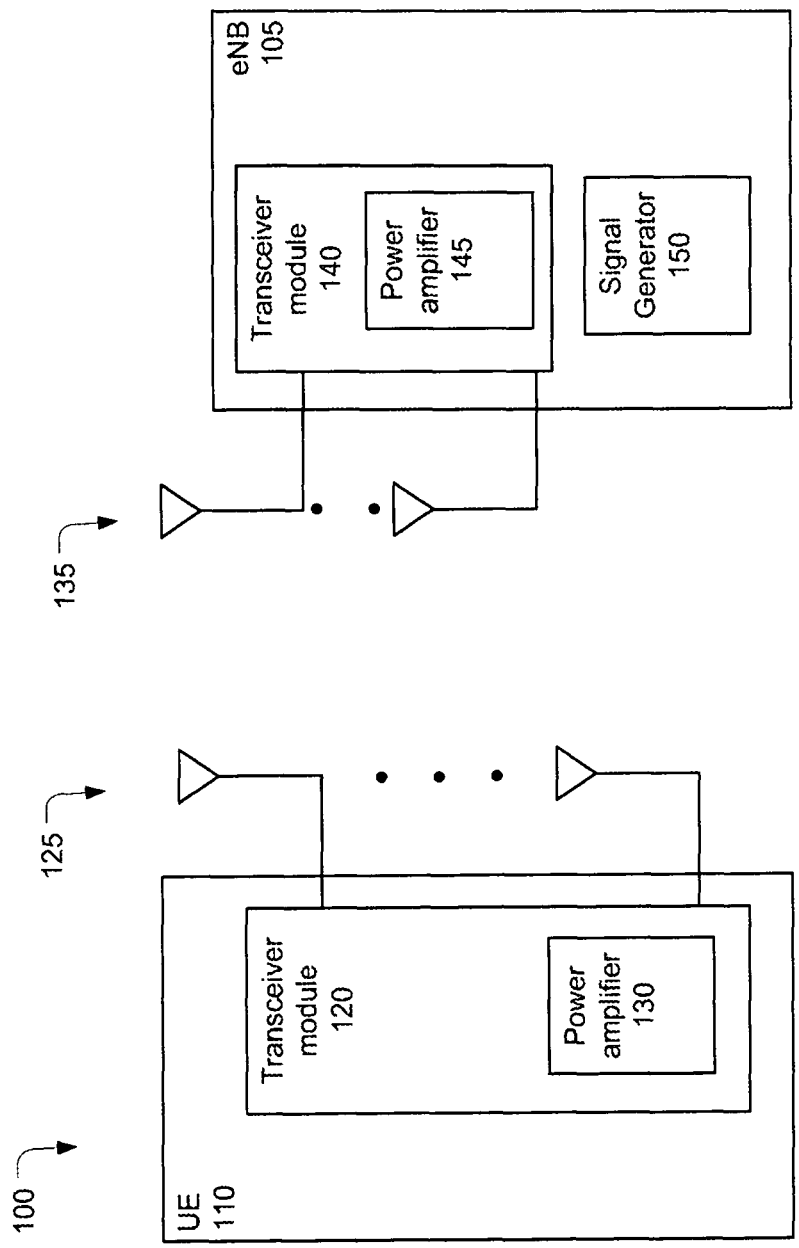
FIG. 1 schematically illustrates a high-level example of a network system comprising a UE and an eNB, in accordance with various embodiments.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network (E-UTRAN). The network 100 may include an eNB 105, configured to wirelessly communicate with a UE 110.

As shown in FIG. 1, the UE 110 may include a transceiver module 120. The transceiver module 120 may be further coupled with one or more of a plurality of antennas 125 of the UE 110 for communicating wirelessly with other components of the network 100, e.g., eNB 105. The antennas 125 may be powered by a power amplifier 130 which may be a component of the transceiver module 120, as shown in FIG. 1, or may be a separate component of the UE 110. In one embodiment, the power amplifier 130 provides the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD) or multiple-input multiple-output (MIMO). In certain embodiments the transceiver module 120 may contain both transmission and reception circuitry. In other embodiments, the transceiver module 120 may be replaced by transmitting circuitry and receiving circuitry which are separate from one another (not shown). In other embodiments, the transceiver module 120 may be coupled with processing circuitry configured to alter, process, or transform signals or data received from, or sent to, the transceiver module 120 (not shown).

Similarly to the UE 110, the eNB 105 may include a transceiver module 140. The transceiver module 140 may be further coupled with one or more of a plurality of antennas 135 of the eNB 105 for communicating wirelessly with other components of the network 100, e.g., LIE 110. The antennas 135 may be powered by a power amplifier 145 which may be a component of the transceiver module 140, as shown in FIG. 1, or may be a separate component of the eNB 105. In one embodiment, the power amplifier 145 provides the power for all transmissions on the antennas 135. In other embodiments, there may be multiple power amplifiers on the eNB 105. The use of multiple antennas 135 may allow for the eNB 105 to use transmit diversity techniques such as SORTD or MIMO. In certain embodiments the transceiver module 140 may contain both transmission and reception circuitry. In other embodiments, the transceiver module 140 may be replaced by transmitting circuitry and receiving circuitry which are separate from one another (not shown). In other embodiments, the transceiver module 140 may be coupled with processing circuitry configured to alter, process, or transform signals or data received from, or sent to, the transceiver module 120 (not shown).

In embodiments the eNB 105 may additionally include a signal generator 150. The signal generator may be configured to identify and/or generate a signal such as a CRS, or elements of the CRS such as initialization parameters. Additionally or alternatively, the signal generator 150 may be configured to initialize or generate a pseudo-random code. Although the signal generator 150 is shown as a single module in FIG. 1, in other embodiments the signal generator 150 may be a plurality of modules configured to communicate with one another.

Figure 2:
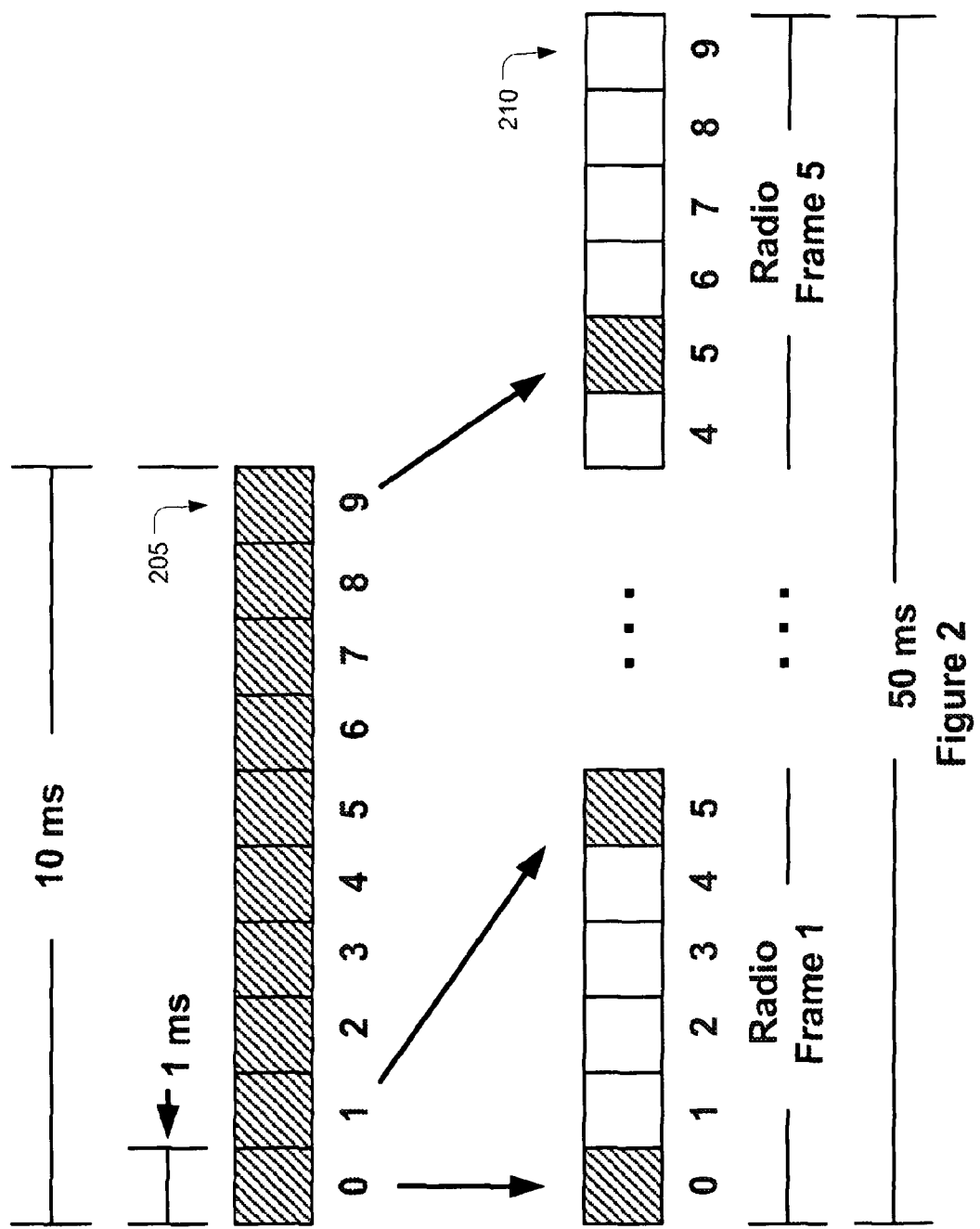
FIG. 2 illustrates example radio frames and radio transmissions, in accordance with various embodiments.

In some embodiments, the CRS may be transmitted in every subframe of a radio frame. FIG. 2 depicts a radio frame 205 including ten subframes each, numbered from subframe 0 through subframe 9. As discussed herein, and for the ease of reference only, the radio frame 205 shall be discussed as a legacy carrier type (LCT) radio frame 205. As shown in FIG. 2, the LCT radio frame 205 may be ten ms long, and each subframe of the LCT radio frame 205 may be one ms long. Each subframe may include two slots (not shown). As discussed above, in some embodiments, the CRS may be transmitted in its entirety in each subframe of the radio frame 205. That is, in some embodiments, the CRS may be transmitted in each of subframes 0, 1, 2, etc. In other embodiments, portions of the CRS may be transmitted in each subframe. For example, if the CRS was comprised of 100 resource elements, then the first 10 resource elements may be transmitted in subframe 0, the second 10 resource elements in subframe 1, etc.

In some embodiments, a new carrier type (NCT) is being discussed which may result in increased downlink throughput for an eNB such as eNB 105. In embodiments, the NCT may only transmit the CRS every 5 ms. That is, as shown in FIG. 2, the CRS may be transmitted every fifth subframe such as subframes 0 and 5 in a first radio frame, second radio frame, third radio frame, fourth radio frame and fifth radio frame. If the subframe indices are properly adjusted in NCT, the CRS may be transmitted every fifth subframe such as subframes 0 and 5. In other embodiments, the CRS may be transmitted every fifth subframe starting at subframes 1, 2, 3, or 4. Similarly to the LCT radio frame 205, the entire CRS may be transmitted in each of the indicated subframes in the NCT transmission 210. For example, the entire CRS sequence may be mapped to each of subframes 0 and 5 in a first radio frame, subframes 0 and 5 in a second radio frame, . . . , subframes 0 and 5 in a fifth radio frame for NCT so that the length of NCT CRS sequence for a periodicity is equivalent to that of an LCT one. In other embodiments, as indicated by the arrows from the LCT radio frame 205 to the NCT transmission 210, portions of the CRS may be transmitted in different subframes. For example, if the CRS is comprised of 100 resource elements, then the first 10 resource elements may be transmitted in subframe 0, the second 10 resource elements in subframe 5, etc.

Figure 3:
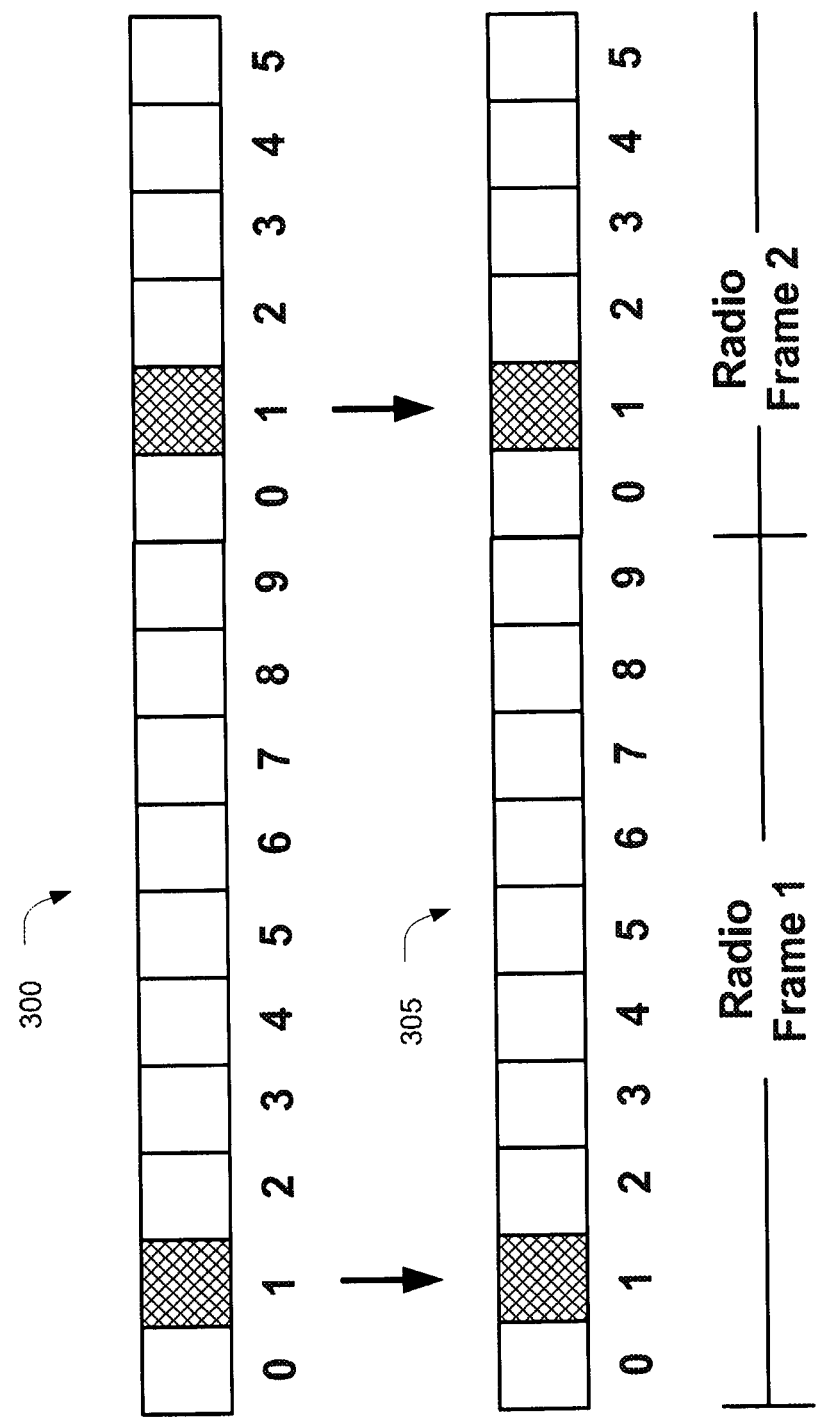
FIG. 3 illustrates example CRS interference in radio frame transmissions, in accordance with various embodiments.

As discussed above, in some embodiments CRS transmissions from two different eNBs, or from two different ports on a single eNB, may conflict with one another. FIG. 3 shows an example of two radio transmissions 300 and 305. In embodiments, the radio transmission 300 may be from a different eNB than the radio transmission 305. In other embodiments, the radio transmission 300 and the radio transmission 305 may be from the same eNB, but from different ports. In FIG. 3, the CRS transmission on subframe 1 of the first radio frame of the first radio transmission 300 may conflict with the CRS transmission on subframe 1 of the first radio frame of the second radio transmission 305 in radio frame 1. However, as discussed above, in embodiments the radio frame may be 10 ms long. Additionally, the CRS may have a periodicity of 10 ms, that is the CRS may repeat every 10 ms. Therefore, as shown in FIG. 3, the CRS transmission on subframe 1 of the second radio frame of the first radio transmission 300 may likewise conflict with the CRS transmission on subframe 1 of the second radio frame of the second radio transmission 305. This conflict may continue for the first subframe of each radio frame beyond the first and second radio frames. In embodiments where NCT is used for NCT transmission, the conflict between subframes, and the repetition of that conflict, may be likewise present for similar reasons.

In embodiments, the CRS may be denoted by $r_{l,n_s}(m)$. The reference-signal may be calculated according to the following equation:

$$r_{l,n_s}(m) = \frac{1}{\sqrt{2}}(1 - 2*c(2m)) + j\frac{1}{2}(1 - 2*c(2m+1)), \quad \text{(Equation 1)}$$

$$m = 0, 1, \ldots, 2N_{RB}^{max,DL} - 1$$

where $n_s$ may be the slot number within the radio frame, l may be the orthogonal frequency division multiplexed (OFDM) symbol within the slot, c(i) may be a pseudo-random sequence, $N_{RB}^{max,DL}$ may be the largest downlink bandwidth configuration of the eNB, and j may be an imaginary number.

In embodiments, the pseudo-random sequence c(i) may be initialized with $c_{init}$, which may be defined as:

$$c_{init} = 2^{10}*(7*(n_s+1)+l+1)*(2*N_{ID}^{cell}+1)+2*+N_{ID}^{cell}+N_{CP} \quad \text{(equation 2)}$$

at the start of each OFDM symbol where $N_{CP}=1$ for an LTE radio frame with a normal cyclic prefix, $N_{CP}=0$ for an LTE radio frame with an extended cyclic prefix, and $N_{ID}^{cell}$ may be the physical layer cell identity.

In some embodiments, $c_{init}$ may be defined by values for one of two m-sequences in a Gold sequence to generate a pseudo-random sequence. In LTE, $c_{init}$ may be defined by values for the second m-sequence of a length-31 Gold sequence comprising two length-31 m-sequence generators. That is, in some embodiments different parameters or sets of parameters of $c_{init}$ may be dedefined by different sets of values of the length-31 Gold sequence. In embodiments, equation 2 may only be defined by 28-bit values of the length-31 Gold sequence discussed above. As an example, in these embodiments the $c_{init}$ term $(7*(n_s+1)+l+1)$ may be defined by 8 bits in the length-31 Gold sequence, the $c_{init}$ term $(2*N_{ID}^{cell}+1)$ may be defined by 10 bits in the length-31 Gold sequence, and the $c_{init}$ term $2*N_{ID}^{cell}+N_{CP}$ may be defined by 10 bits in the length-31 Gold sequence.

As can be seen above, Equation 1, which may define a CRS, may be dependent upon a number of variables. Specifically, Equation 1 is dependent on the OFDM symbol, and a pseudo-random sequence. As can be seen in Equation 2, the pseudo-random sequence may be initialized based on the OFDM in which the CRS is being transmitted, the physical layer cell identity, and the cyclic prefix. That is, equation 2 may be re-expressed as $c_{init} = f(n_s, l, N_{ID}^{cell}, N_{CP})$. Commonly, these variables may not change from radio frame to radio frame in a transmission. That is, the variables may not have a periodicity greater than 10 ms. Therefore, in embodiments, the CRS transmissions themselves may be substantially similar from radio frame to radio frame as described above with reference to FIG. 3.

However, in embodiments of the present disclosure, an additional initialization parameter may be added to the pseudo-random sequence initialization, equation 2. In embodiments, this additional initialization parameter may be a parameter with a periodicity that is greater than one radio frame such as the SFN That is, in embodiments equation 2 may be re-expressed as:

$$c_{init} = f(SFN, n_s, l, N_{ID}^{cell}, N_{CP}) \quad \text{(equation 3)}.$$

As a specific example of using the SFN, equation 3 may be as follows:

$$c_{init} = \text{mod}(2^{28}*SFN + 2^{10}*(7*(n_s+1)+l+1)*(2*N_{ID}^{cell}+1)+2*N_{ID}^{cell}+N_{CP}, X) \quad \text{(equation 4)}$$

where $X = 2^{31}$. Generally, equation 4 may be abstracted as an example of $c_{init} = 2^{28}*g(SFN) + \text{equation 2}$ (equation 5) where $g(SFN) = \text{mod}(SFN, 2^K)$ where K may be the number of bits available in length-31 Gold sequence to define the SFN. For example, as noted above, equation 2 may already be defined by 28 bits of the length-31 Gold sequence, leaving 3 bits of the length-31 Gold sequence available to accommodate the SFN. Therefore, in this example, K may be equal to 3. In embodiments, the SFN may typically need at least 12 bits to define the SFN ranging from 0 to 4095, and so it may be desirable to perform the modular operation of the SFN by $2^K$ to reduce the number of bits necessary to define the SFN.

As noted above, in some embodiments NCT may be used. As described above with reference to FIG. 2, in embodiments the NCT may transmit the CRS in only two subframes of a radio frame. Additionally, each subframe may comprise two slots. Therefore, in NCT, four slots may be available for CRS transmission. In these embodiments, the pseudo-random sequence initialization for CRS, $c_{init\_NCT}$, may be defined as $$c_{init\_NCT} = 2^{10}*(7*(\text{mod}(n_s, Y)+1)+l+1)*(2*N_{ID}^{cell}+1) + 2*N_{ID}^{cell}+N_{CP} \quad \text{(Equation 6)}$$

where Y is the number of slots for CRS transmission within a radio frame of an NCT transmission. As discussed above, in this embodiment, Y may be equal to four because four slots are available to transmit the CRS within an NCT radio frame. With the modification described in equation 6, $c_{init\_NCT}$ may be reduced for NCT transmission from being defined by 28 bits of the length-31 Gold sequence to only being defined by 26 bits of the length-31 Gold sequence for initialization. Thus, five bits of the length-31 Gold sequence may be available to define the SFN. Equation 5 may therefore be modified by equation 6 such that $c_{init\_NCT} = 2^{28}*g(SFN) + \text{equation 6}$ (equation 7) where $g(SFN) = \text{mod}(SFN, 2^K)$ where K is equal to 5. As a specific example, equation 7 may be shown as:

$$c_{init\_NCT} = \text{mod}(2^{28}*SFN + 2^{10}*(7*(\text{mod}(n_s, Y)+1)+l+1)*(*N_{ID}^{cell}+1)+2*N_{ID}^{cell}+N_{CP}, X) \quad \text{(equation 8)}$$

In another embodiment, the number of bits of the length-31 Gold sequence used to define $c_{init\_NCT}$ may be compressed in a manner similar to equation 6 by the following modification:

$$c_{init\_NCT} = 2^{10} * \left(7 * \left(\text{mod}(n_s, 2) + \text{floor}\left(\frac{n_s}{T_{n_s}}\right) + 1\right) + l + 1\right) * \quad \text{(Equation 9)}$$
$$(2 * N_{ID}^{cell} + 1) + 2 * N_{ID}^{cell} + N_{CP}$$

Where $T_{n_s}$ may be the number of slots corresponding to CRS periodicity in NCT. For example, if CRS is transmitted at every five subframes (i.e. 5 ms periodicity in terms of CRS occasion), then $T_{n_s}$ may be equal to ten (based on five subframes and two slots per subframe) and $n_s$ may be 0, . . . , 19. In some embodiments, $T_{n_s}$ may be based on the number of slots in a single transmission that spans multiple radio frames wherein $n_s$ may be extended larger than 19. Equation 9 may be modified to include the SFN in a manner similar to equations 7 and 8, above, with more than three bits of the length-31 Gold sequence used to accommodate the SFN or some other parameter with a periodicity larger than a radio frame.

In some embodiments, instead of directly applying the SFN as a factor to the existing equation 2, the SFN may be used to modify one or more other factors of $c_{init}$. For example, the SFN may be used to directly modify the physical cell ID as follows:

$$c_{init} = 2^{10}*(7*(n_s+1)+l+1)*(2*\text{mod}(N_{ID}^{cell} + f(SFN), N_{ID,max}^{cell})+1)+2*\text{mod}(N_{ID}^{cell} + f(SFN), N_{ID,max}^{cell})+N_{CP} \quad \text{(Equation 10)}.$$

where $N_{ID,max}^{cell}$ may be 504.

In other embodiments, the SFN may be used to directly modify the slot number as follows:

$$c_{init}=2^{10}*(7*(\mathrm{mod}(n_s+f(\mathrm{SFN}),n_{s,max})+1)+l+1)* \\ (2*N_{ID}^{cell}+1)+2*N_{ID}^{cell}+N_{CP} \quad \text{(Equation 11)}.$$

where $n_{s,max}$ may be 20.

In some embodiments, the SFN may be used to directly modify the symbol index as follows:

$$c_{init}=2^{10}*(7*(n_s+1)+\mathrm{mod}(l+f(\mathrm{SFN}),l_{max})+ \\ 1)*(2*N_{ID}^{cell}+1)+2*N_{ID}^{cell}+N_{CP} \quad \text{(Equation 12)}.$$

where $l_{max}$ may be 7 in normal CP case and 6 in extended CP case.

In some embodiments, the SFN may be used to directly modify the cyclic prefix type as follows:

$$c_{init}=2^{10}*(7*(n_s+1)+l+1)*(2*N_{ID}^{cell}+1)+2*N_{ID}^{cell}+ \\ \mathrm{mod}(N_{CP}+f(\mathrm{SFN}),2) \quad \text{(equation 13)}.$$

In some embodiments, the SFN may be used to directly modify $c_{init}$ as follows:

$$c_{init}=\mathrm{mod}(2^{10}*(7*(n_s+1)+l+1)*(2*N_{ID}^{cell}+1)+2*+ \\ N_{CP}+f(\mathrm{SFN}),2^{31}) \quad \text{(equation 14)}.$$

In the embodiments described above, $f(\mathrm{SFN})$ may be equal to the SFN. In other embodiments, $f(\mathrm{SFN})$ may be a function of the SFN. In some embodiments, the SFN may be applied to a plurality of factors, for example both the cyclic prefix and the symbol index. In some embodiments, factors of the $c_{init\_NCT}$ as described by equations 6 or 9 may be modified in a manner similar to the modification of factors of $c_{init}$ in equations 10-14 to modify the factors of the $c_{init\_NCT}$ by the SFN.

In some embodiments, it may be desirable to modify an NCT transmission such as NCT transmission 210 to have the same periodicity as the CRS of the LCT radio frame 205. In other words, it may be desirable to modify the NCT transmission 210 to have a periodicity of 20 slots within a radio frame rather than the four slots described above. In this embodiment, and assuming that CRS may be transmitted every 5 ms in NCT transmission 210, $c_{init}$ may be modified as:

$$c_{init}=2^{10}*(7*(\tilde{n}_s+1)+l+1)*(2*N_{ID}^{cell}+1)+2*N_{ID}^{cell}+ \\ N_{CP} \quad \text{(Equation 15)}$$

where $$\tilde{n}_s = \left(4*SFN - \left(n_s - \left\lfloor\frac{n_s}{10}\right\rfloor*8\right)\right)\mathrm{mod}(M). \quad \text{(Equation 16)}$$

In this embodiment, if the sequence periodicity of the CRS is 10 ms counting only the subframes with CRS data, then M may be equal to 20. Specifically, M may be equal to 20 because in a radio frame with 10 subframes, there may be 20 slots. By using equations 15 and 16, the periodicity of the pseudo-random sequence generation of the LCT radio frame 205 may be extended to the NCT transmission 210.

Figure 4:
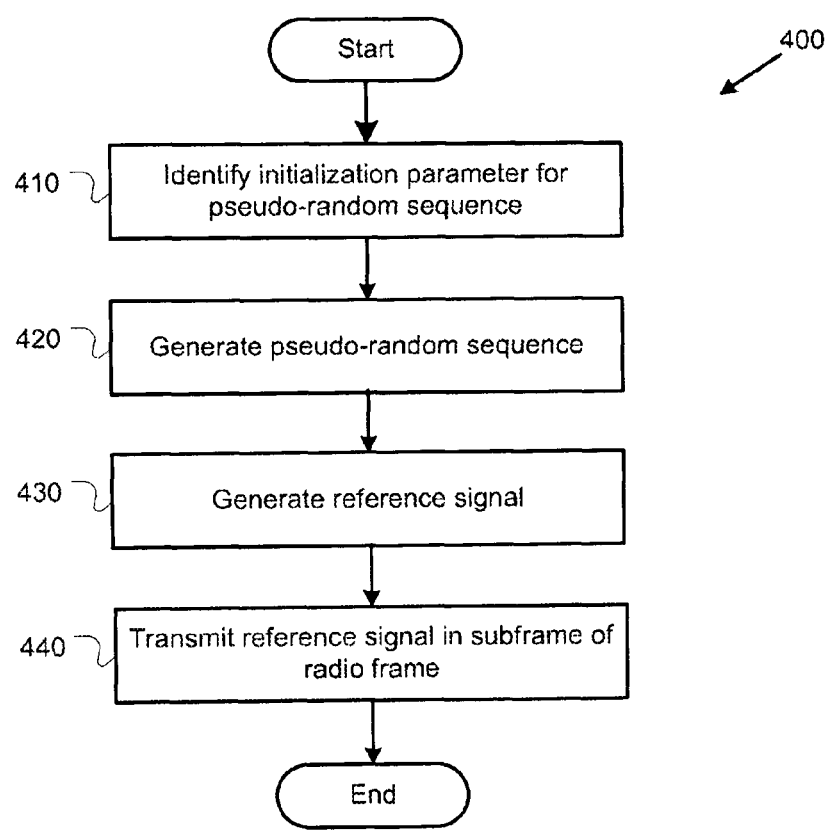
FIG. 4 is an example process of constructing a CRS at an eNB, in accordance with various embodiments.

FIG. 4 depicts an example of a process 400 for generating and transmitting a CRS in a subframe of a radio frame such as the LCT radio frame 205 or a radio frame of NCT transmission 210. The process 400 may occur in an eNB such as eNB 105. In some embodiments, the process 400 may occur in one or both of the transceiver module 140 and the signal generator 150. In embodiments, an initialization parameter for a pseudo-random sequence may be identified at 410. Specifically, the SFN may be identified as discussed above, although in other embodiments other initialization parameters with a periodicity greater than 10 ms may be identified. A pseudo-random sequence may be generated at 420. In embodiments, the pseudo-random sequence may be generated based on the initialization parameter identified in 410. Next, a reference signal may be generated at 430. In embodiments, the reference signal may be a CRS and may be based on the pseudo-random sequence generated at 420. In some embodiments, the reference signal may be the same as the pseudo-random sequence. Finally, the reference signal, for example the CRS, may be transmitted in a subframe of a radio frame at 440.

In embodiments, the use of the process 400, and specifically the addition of the SFN to the initialization of the pseudo-random sequence used to generate the CRS, may resolve the conflicts described above with respect to FIG. 3. Specifically, the periodicity of the CRS may be extended beyond 10 ms. Therefore, if the CRS transmission in subframe 1 of the first radio frame of the first radio transmission 300 conflicts with the CRS transmission in subframe 1 of the first radio frame of the second radio transmission 305, this conflict may not be repeated in later frames due to the extended CRS periodicity. In other words, the CRS transmission of subframe 1 of the second radio frame of the first radio transmission 300 may not conflict with the CRS transmission in subframe 1 of the second radio frame of the second radio transmission 305.

Figure 5:
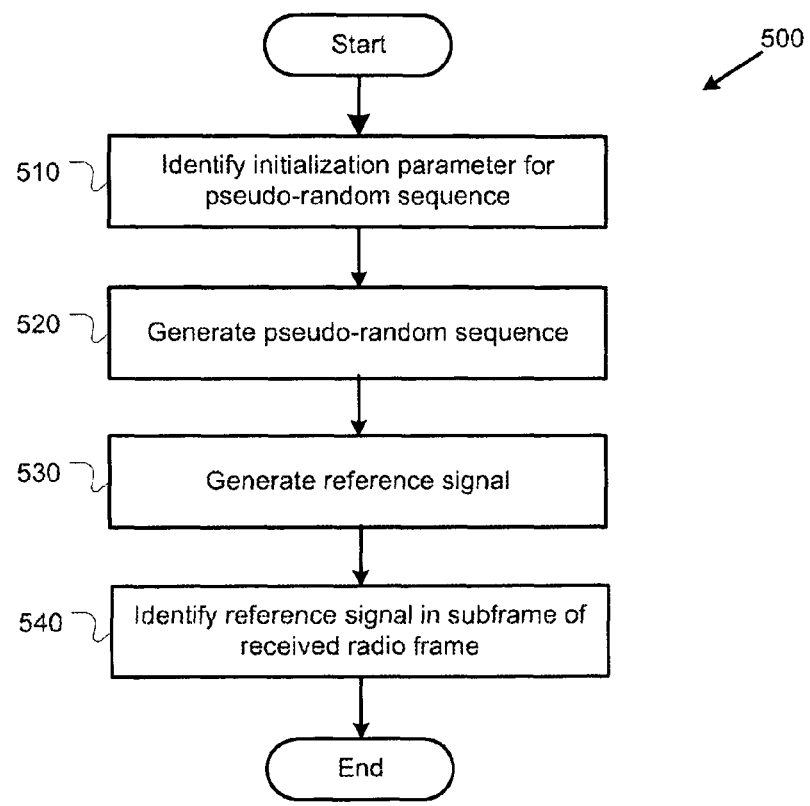
FIG. 5 is an example process of identifying a CRS at a UE, in accordance with various embodiments.

FIG. 5 depicts an example process 500 that may be used by a UE such as UE 110 receiving the CRS in one or more subframes from an eNB such as eNB 105. In embodiments, the UE may need to be able to identify the CRS in the signal received from the eNB. Therefore, the process 500 used by the UE to identify the CRS may be similar to the process used by the eNB to generate the CRS. As an example, the UE may first identify an initialization parameter for a pseudo-random sequence at 510. Specifically, the initialization parameter may be the SFN as discussed above, although in other embodiments other initialization parameters with a periodicity greater than 10 ms may be identified. A pseudo-random sequence may then be generated by the UE at 520. In embodiments, the pseudo-random sequence may be generated based on the initialization parameter identified in 510. Next, a reference signal may be generated at 530. In embodiments, the reference signal may be a CRS and may be based on the pseudo-random sequence generated at 520. In some embodiments, the reference signal may be the same as the pseudo-random sequence. Finally, the reference signal, for example the CRS, may be identified in a subframe of a radio frame received from the eNB at 540.

Figure 6:
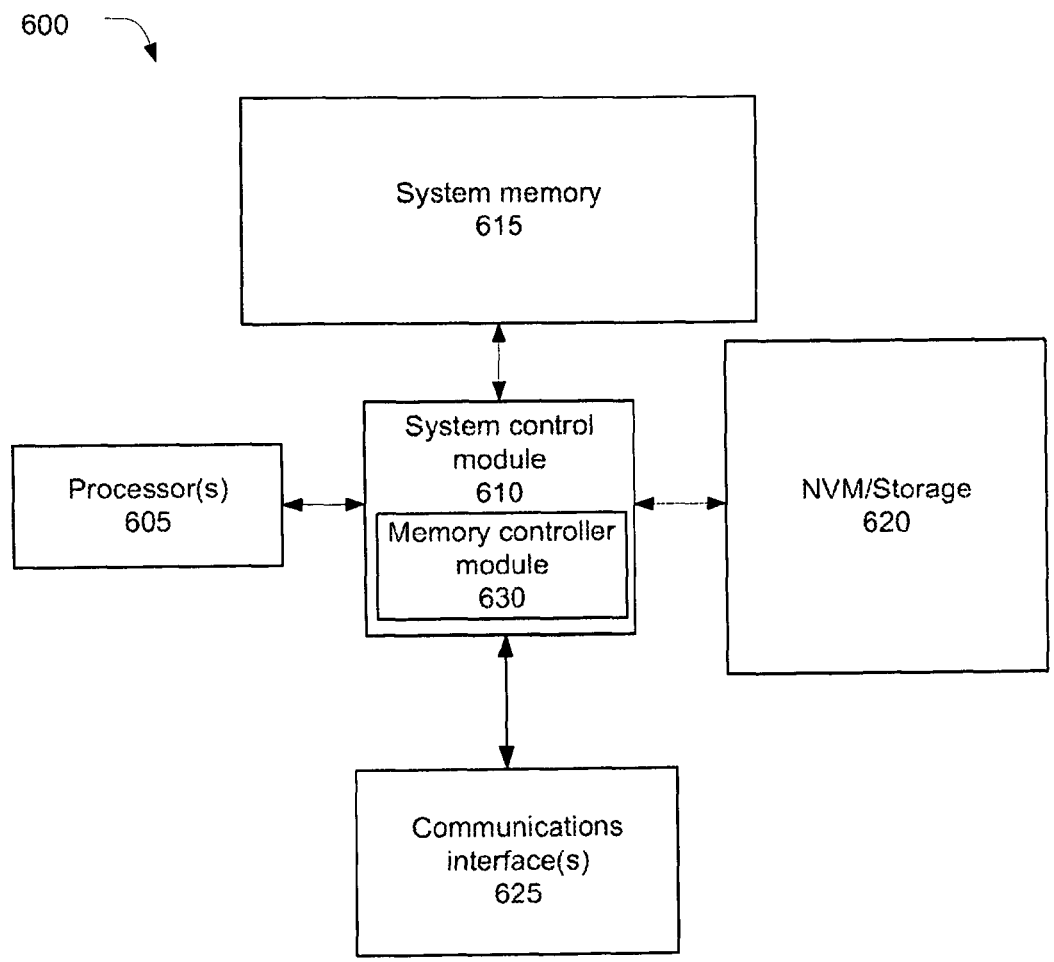
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 as described herein. In other embodiments, the system 600 may be capable of functioning as the eNB 105 depicted in the embodiment shown in FIG. 1 or any one of the other described embodiments. In some embodiments, the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 620 may include a storage resource physically part of a device on which the system 600 is installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. For example, the communications interface(s) 625 may be coupled with the transceiver module 140 discussed above with respect to FIG. 1.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, etc.). In various embodiments, the system 600 may have more or less components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

Methods and apparatuses are provided herein for generating a pseudo-random sequence for generating a CRS.

Example 1 may include an eNB to generate a reference signal, the eNB comprising: a sequence generator to: identify an initialization parameter for a pseudo-random sequence with a periodicity greater than one radio frame of a radio signal, wherein the radio frame includes a plurality of subframes; generate, based at least in part on the initialization parameter, the pseudo-random sequence; and generate, based at least in part on the pseudo-random sequence, the reference signal; and a transmitter coupled with the sequence generator, the transmitter to transmit the reference signal in a subframe of the one radio frame.

Example 2 may include the eNB of example 1, wherein the transmitter is further to transmit the reference signal in at least two subframes of the radio frame.

Example 3 may include the eNB of example 2, wherein the transmitter is further to transmit the reference signal in each subframe of the radio frame.

Example 4 may include the eNB of any of examples 1-3, wherein the initialization parameter is a system frame number.

Example 5 may include the eNB of example 4, wherein the initialization parameter is based at least in part on a modular operation of a number of slots in the radio frame.

Example 6 may include the eNB of example 4, wherein the initialization parameter is a first system frame number, the reference signal is a first reference signal, the pseudo-random sequence is a first pseudo-random sequence, and the radio frame is a first radio frame, and the sequence generator is further to: identify a second system frame number of a second radio frame, the second system frame number different from the first system frame number; generate a second pseudo-random sequence based at least in part on the second system frame number; and generate a second reference signal based at least in part on the second pseudo-random sequence; and the transmitter is further to transmit the second reference signal in the second radio frame.

Example 7 may include the eNB of any of examples 1-3, wherein the radio frame is a downlink radio frame of a long term evolution (LTE) network.

Example 8 may include the eNB of any of examples 1-3, wherein the pseudo-random sequence is based at least in part on a length-31 Gold sequence.

Example 9 may include the eNB of example 8, wherein the initialization parameter is based on more than three bits of information in the length-31 Gold sequence.

Example 10 may include a method of generating a reference signal, the method comprising: identifying, at a base station, an initialization parameter for a pseudo-random sequence with a periodicity greater than one radio frame of a radio signal, each radio frame comprising a plurality of subframes; generating, at the base station, based at least in part on the initialization parameter, the pseudo-random sequence; generating, at the base station, the reference signal based at least in part on the pseudo-random sequence; and transmitting, at the base station, the reference signal in a subframe of the plurality of subframes.

Example 11 may include the method of example 10, further comprising transmitting, at the base station, the reference signal in two subframes of the radio frame.

Example 12 may include the method of example 11, further comprising transmitting, at the base station, the reference signal in each subframe of the radio frame.

Example 13 may include the method of any of examples 10-12, wherein the initialization parameter is a system frame number.

Example 14 may include the method of example 13, wherein the initialization parameter is based at least in part on a modular operation, and the modular operation is based at least in part on a number of slots in the radio frame.

Example 15 may include the method of example 13, wherein the initialization parameter is a first system frame number, the reference signal is a first reference signal, the pseudo-random sequence is a first pseudo-random sequence, and the radio frame is a first radio frame, and further comprising: identifying, at the base station, a second system frame number of a second radio frame, the second system frame number different from the first system frame number; generating, at the base station, a second pseudo-random sequence based at least in part on the second system frame number; generating, at the base station, a second reference signal based at least in part on the second pseudo-random sequence; and transmitting, at the base station, the second reference signal in the second radio frame.

Example 16 may include the method of any of examples 10-12, wherein the radio frame is a downlink radio frame of a long term evolution (LTE) network.

Example 17 may include the method of any of examples 10-12, wherein the pseudo-random sequence is based at least in part on a length-31 Gold sequence.

Example 18 may include the method of example 17, wherein the initialization parameter is defined in the length-31 Gold sequence by more than three bits of information.

Example 19 may include an enhanced NodeB (eNB) to generate a reference signal, the eNB comprising: means to identify an initialization parameter for a pseudo-random sequence with a periodicity greater than one radio frame of a radio signal, each radio frame comprising a plurality of subframes; means to generate based at least in part on the initialization parameter, the pseudo-random sequence; means to generate the reference signal based at least in part on the pseudo-random sequence; and means to transmit the reference signal in a subframe of the plurality of subframes.

Example 20 may include the eNB of example 19, further comprising means to transmit the reference signal in two subframes of the radio frame.

Example 21 may include the eNB of example 20, further comprising means to transmit the reference signal in each subframe of the radio frame.

Example 22 may include the eNB of any of examples 19-22, wherein the initialization parameter is a system frame number.

Example 23 may include the eNB of example 22, wherein the initialization parameter is based at least in part on a modular operation, and the modular operation is based at least in part on a number of slots in the radio frame.

Example 24 may include the eNB of example 22, wherein the initialization parameter is a first system frame number, the reference signal is a first reference signal, the pseudo-random sequence is a first pseudo-random sequence, and the radio frame is a first radio frame, and further comprising: means to identify a second system frame number of a second radio frame, the second system frame number different from the first system frame number; means to generate a second pseudo-random sequence based at least in part on the second system frame number; means to generate a second reference signal based at least in part on the second pseudo-random sequence; and means to transmit the second reference signal in the second radio frame.

Example 25 may include the eNB of any of examples 19-22, wherein the radio frame is a downlink radio frame of a long term evolution (LTE) network.

Example 26 may include the eNB of any of examples 19-22, wherein the pseudo-random sequence is based at least in part on a length-31 Gold sequence.

Example 27 may include the eNB of example 26, wherein the initialization parameter is defined in the length-31 Gold sequence by more than three bits of information.

Example 28 may include one or more computer readable media comprising instructions to generate a reference signal, the instructions, when executed by one or more processors of an enhanced NodeB (eNB) of a long term evolution (LTE) network), to: identify an initialization parameter for a pseudo-random sequence with a periodicity greater than one radio frame of a radio signal, each radio frame comprising a plurality of subframes; generate based at least in part on the initialization parameter, the pseudo-random sequence; generate the reference signal based at least in part on the pseudo-random sequence; and transmit the reference signal in a subframe of the plurality of subframes.

Example 29 may include the one or more computer readable media of example 28, the instructions further to transmit the reference signal in two subframes of the radio frame.

Example 30 may include the one or more computer readable media of example 29, the instructions further to transmit the reference signal in each subframe of the radio frame.

Example 31 may include the one or more computer readable media of any of examples 28-30, wherein the initialization parameter is a system frame number.

Example 32 may include the one or more computer readable media of example 31, wherein the initialization parameter is based at least in part on a modular operation, and the modular operation is based at least in part on a number of slots in the radio frame.

Example 33 may include the one or more computer readable media of example 31, wherein the initialization parameter is a first system frame number, the reference signal is a first reference signal, the pseudo-random sequence is a first pseudo-random sequence, and the radio frame is a first radio frame, and the instructions further to: identify a second system frame number of a second radio frame, the second system frame number different from the first system frame number; generate a second pseudo-random sequence based at least in part on the second system frame number; generate a second reference signal based at least in part on the second pseudo-random sequence; and transmit the second reference signal in the second radio frame.

Example 34 may include the one or more computer readable media of any of examples 28-30, wherein the radio frame is a downlink radio frame of a long term evolution (LTE) network.

Example 35 may include the one or more computer readable media of any of examples 28-30, wherein the pseudo-random sequence is based at least in part on a length-31 Gold sequence.

Example 36 may include the one or more computer readable media of example 35, wherein the initialization parameter is defined in the length-31 Gold sequence by more than three bits of information.

Example 37 may include one or more computer readable media comprising instructions to identify a cell-specific reference signal (CRS), the instructions, when executed by one or more processors, cause a user equipment (UE) of a long term evolution (LTE) network to: identify an initialization parameter for a pseudo-random sequence with a periodicity greater than one LTE radio frame, each LTE radio frame comprising a plurality of subframes received from an enhanced NodeB (eNB) of the LTE network; generate, based at least in part on the initialization parameter, the pseudo-random sequence; generate, based at least in part on the pseudo-random sequence, the CRS; and identify the CRS in a subframe of an LTE radio frame received from the eNB.

Example 38 may include the one or more computer readable media of example 37, wherein the initialization parameter is a system frame number.

Example 39 may include the one or more computer readable media of example 38, wherein the initialization parameter is modulated by a number of slots in the LTE radio frame.

Example 40 may include the one or more computer readable media of examples 38 or 39, wherein the initialization parameter is a first system frame number, the reference signal is a first reference signal, the pseudo-random sequence is a first pseudo-random sequence, and the LTE radio frame is a first LTE radio frame, and the instructions, when executed, further cause the UE to: identify a second system frame number of a second LTE radio frame received from the base station, the second system frame number different from the first system frame number; generate a second pseudo-random sequence based at least in part on the second system frame number; generate a second reference signal based at least in part on the second pseudo-random sequence; and identify the second reference signal in the second LTE radio frame.

Example 41 may include a method of identifying a cell-specific reference signal (CRS): identifying, by a user equipment (UE) of a long term evolution (LTE) network, an initialization parameter for a pseudo-random sequence with a periodicity greater than one LTE radio frame, each LTE radio frame comprising a plurality of subframes received from an enhanced NodeB (eNB) of the LTE network; generating, by the UE, based at least in part on the initialization parameter, the pseudo-random sequence; generating, by the UE, based at least in part on the pseudo-random sequence, the CRS; and identifying, by the UE, the CRS in a subframe of an LTE radio frame received from the eNB.

Example 42 may include the method of example 41, wherein the initialization parameter is a system frame number.

Example 43 may include the method of example 42, wherein the initialization parameter is modulated by a number of slots in the LTE radio frame.

Example 44 may include the method of examples 42 or 43, wherein the initialization parameter is a first system frame number, the reference signal is a first reference signal, the pseudo-random sequence is a first pseudo-random sequence, and the LTE radio frame is a first LTE radio frame, and the method further comprising: identifying, by the UE a second system frame number of a second LTE radio frame received from the base station, the second system frame number different from the first system frame number; generating, by the UE, a second pseudo-random sequence based at least in part on the second system frame number; generating, by the UE, a second reference signal based at least in part on the second pseudo-random sequence; and identifying, by the UE the second reference signal in the second LTE radio frame.

Example 45 may include a user equipment (UE) of a long term evolution (LTE) network to identify a cell-specific reference signal (CRS), the UE comprising: means to identify an initialization parameter for a pseudo-random sequence with a periodicity greater than one LTE radio frame, each LTE radio frame comprising a plurality of subframes received from an enhanced NodeB (eNB) of the LTE network; means to generate, based at least in part on the initialization parameter, the pseudo-random sequence; means to generate, based at least in part on the pseudo-random sequence, the CRS; and means to identify the CRS in a subframe of an LTE radio frame received from the eNB.

Example 46 may include the UE of example 45, wherein the initialization parameter is a system frame number.

Example 47 may include the UE of example 46, wherein the initialization parameter is modulated by a number of slots in the LTE radio frame.

Example 48 may include the UE of examples 45 or 46, wherein the initialization parameter is a first system frame number, the reference signal is a first reference signal, the pseudo-random sequence is a first pseudo-random sequence, and the LTE radio frame is a first LTE radio frame, and the UE further comprises: means to identify a second system frame number of a second LTE radio frame received from the base station, the second system frame number different from the first system frame number; means to generate a second pseudo-random sequence based at least in part on the second system frame number; means to generate a second reference signal based at least in part on the second pseudo-random sequence; and means to identify the second reference signal in the second LTE radio frame.

Example 49 may include a user equipment (UE) of a long term evolution (LTE) network to identify a cell-specific reference signal (CRS), the UE comprising: a memory; a processor coupled with the memory, the processor to: identify an initialization parameter for a pseudo-random sequence with a periodicity greater than one LTE radio frame, each LTE radio frame comprising a plurality of subframes received from an enhanced NodeB (eNB) of the LTE network; generate, based at least in part on the initialization parameter, the pseudo-random sequence; generate, based at least in part on the pseudo-random sequence, the CRS; and identify the CRS in a subframe of an LTE radio frame received from the eNB.

Example 50 may include the UE of example 49, wherein the initialization parameter is a system frame number.

Example 51 may include the UE of example 50, wherein the initialization parameter is modulated by a number of slots in the LTE radio frame.

Example 52 may include the UE of examples 50 or 51, wherein the initialization parameter is a first system frame number, the reference signal is a first reference signal, the pseudo-random sequence is a first pseudo-random sequence, and the LTE radio frame is a first LTE radio frame, and the processor further to: identify a second system frame number of a second LTE radio frame received from the base station, the second system frame number different from the first system frame number; generate a second pseudo-random sequence based at least in part on the second system frame number; generate a second reference signal based at least in part on the second pseudo-random sequence; and identify the second reference signal in the second LTE radio frame.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An eNodeB (eNB) comprising:
   a sequence generator to:
      identify an initialization parameter that is based on a system frame number, the initialization parameter for a pseudo-random sequence with a periodicity greater than one radio frame of a radio signal, wherein the radio frame includes a plurality of subframes;
      generate, based at least in part on the initialization parameter, the pseudo-random sequence; and
      generate, based at least in part on the pseudo-random sequence, a reference signal; and
   a transmitter coupled with the sequence generator, the transmitter to transmit the reference signal in a subframe of the one radio frame.

2. The eNB of claim 1, wherein the transmitter is further to transmit the reference signal in at least two subframes of the radio frame.

3. The eNB of claim 2, wherein the transmitter is further to transmit the reference signal in each subframe of the radio frame.

4. The eNB of claim 1, wherein the initialization parameter is based at least in part on a modular operation of a number of slots in the radio frame.

5. The eNB of claim 1, wherein the initialization parameter is a first system frame number, the reference signal is a first reference signal, the pseudo-random sequence is a first pseudo-random sequence, and the radio frame is a first radio frame, and the sequence generator is further to:
   identify a second system frame number of a second radio frame, the second system frame number different from the first system frame number;
   generate a second pseudo-random sequence based at least in part on the second system frame number; and
   generate a second reference signal based at least in part on the second pseudo-random sequence; and
   the transmitter is further to transmit the second reference signal in the second radio frame.

6. The eNB of claim 1, wherein the radio frame is a downlink radio frame of a long term evolution (LTE) network.

7. The eNB of claim 1, wherein the pseudo-random sequence is based at least in part on a length-31 Gold sequence.

8. The eNB of claim 7, wherein the initialization parameter is based on more than three bits of information in the length-31 Gold sequence.

9. A method comprising:
   identifying, at a base station, an initialization parameter for a pseudo-random sequence with a periodicity greater than one radio frame of a radio signal, each radio frame comprising a plurality of subframes and the initialization parameter being based on a system frame number;
   generating, at the base station, based at least in part on the initialization parameter, the pseudo-random sequence;
   generating, at the base station, a reference signal based at least in part on the pseudo-random sequence; and
   transmitting, at the base station, the reference signal in a subframe of the plurality of subframes.

10. The method of claim 9, further comprising transmitting, at the base station, the reference signal in two subframes of the radio frame.

11. The method of claim 10, further comprising transmitting, at the base station, the reference signal in each subframe of the radio frame.

12. The method of claim 9, wherein the initialization parameter is based at least in part on a modular operation, and the modular operation is based at least in part on a number of slots in the radio frame.

13. The method of claim 9, wherein the initialization parameter is a first system frame number, the reference signal is a first reference signal, the pseudo-random sequence is a first pseudo-random sequence, and the radio frame is a first radio frame, and further comprising:
   identifying, at the base station, a second system frame number of a second radio frame, the second system frame number different from the first system frame number;
   generating, at the base station, a second pseudo-random sequence based at least in part on the second system frame number;
   generating, at the base station, a second reference signal based at least in part on the second pseudo-random sequence; and
   transmitting, at the base station, the second reference signal in the second radio frame.

14. The method of claim 9, wherein the radio frame is a downlink radio frame of a long term evolution (LTE) network.

15. The method of claim 9, wherein the pseudo-random sequence is based at least in part on a length-31 Gold sequence.

16. The method of claim 15, wherein the initialization parameter is defined in the length-31 Gold sequence by more than three bits of information.

17. One or more non-transitory computer readable media comprising instructions, when executed by one or more processors, cause a user equipment of a long term evolution (LTE) network to:
   identify an initialization parameter for a pseudo-random sequence with a periodicity greater than one LTE radio frame, each LTE radio frame comprising a plurality of subframes received from an enhanced NodeB (eNB) of the LTE network and the initialization parameter based on a system frame number;
   generate, based at least in part on the initialization parameter, the pseudo-random sequence;
   generate, based at least in part on the pseudo-random sequence, a cell-specific reference signal (CRS); and
   identify the CRS in a subframe of an LTE radio frame received from the eNB.

18. The one or more non-transitory computer readable media of claim 17, wherein the initialization parameter is modulated by a number of slots in the LTE radio frame.

19. The one or more non-transitory computer readable media of claim 17, wherein the initialization parameter is a first system frame number, the reference signal is a first reference signal, the pseudo-random sequence is a first pseudo-random sequence, and the LTE radio frame is a first LTE radio frame, and the instructions, when executed, further cause the user equipment to:
   identify a second system frame number of a second LTE radio frame received from the base station, the second system frame number different from the first system frame number;
   generate a second pseudo-random sequence based at least in part on the second system frame number;
   generate a second reference signal based at least in part on the second pseudo-random sequence; and identify the second reference signal in the second LTE radio frame.

\* \* \* \* \*